United States Patent
Lee et al.

(10) Patent No.: US 7,180,480 B2
(45) Date of Patent: Feb. 20, 2007

(54) METHOD AND APPARATUS FOR REMOVING FALSE CONTOURS

(75) Inventors: Ho-nam Lee, Suwon-si (KR); Koich Sono, Suwon-si (KR); Bong-hwan Cho, Hwaseong-gun (KR); Tae-young Lee, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 512 days.

(21) Appl. No.: 10/724,238

(22) Filed: Dec. 1, 2003

(65) Prior Publication Data

US 2004/0109088 A1     Jun. 10, 2004

(30) Foreign Application Priority Data

Nov. 29, 2002   (KR) ............... 10-2002-0075299

(51) Int. Cl.
*G09G 3/28* (2006.01)
(52) U.S. Cl. .............................. 345/60; 345/690
(58) Field of Classification Search ............ 345/87–92, 345/98, 104, 213–214, 690–691, 60–68, 345/589; 348/606–609; 375/240.01, 240.03, 375/240.16
See application file for complete search history.

(56) References Cited

U.S. PATENT DOCUMENTS

| 6,097,368 | A | * | 8/2000 | Zhu et al. ............. 345/601 |
| 6,100,863 | A | * | 8/2000 | Zhu .......................... 345/89 |
| 6,441,867 | B1 | * | 8/2002 | Daly ....................... 348/607 |
| 6,661,469 | B1 | * | 12/2003 | Kawabata et al. ...... 348/607 |
| 7,106,476 | B1 | * | 9/2006 | Tonami et al. .......... 358/1.9 |

* cited by examiner

*Primary Examiner*—Richard Hjerpe
*Assistant Examiner*—Mansour M. Said
(74) *Attorney, Agent, or Firm*—Sughrue Mion, PLLC

(57) ABSTRACT

A method and apparatus for removing false contours in a pulse number modulation (PNM) digital display device having a plasma display panel (PDP). The method involves a) comparing the input data with the comparison data and calculating a plurality of possible output data in consideration of an index error between the input data and error-diffused input data so that the false contours can be removed, the error-diffused input data being obtained by diffusing a quantization error that has occurred in pixels adjacent to the input data in the current frame; b) detecting an index error between the input data and the error-diffused input data; and c) selecting one from among the plurality of possible output data obtained in step a) in consideration of the index error detected in step b).

12 Claims, 15 Drawing Sheets

FIG. 9A $\frac{1}{16} \times$ 
| | ▨ | 7 |
|---|---|---|
| 3 | 5 | 1 |

FLOYD & STEINBERG

FIG. 9B $\frac{1}{48} \times$
| | | ▨ | 7 | 5 |
|---|---|---|---|---|
| 3 | 5 | 7 | 5 | 3 |
| 1 | 3 | 5 | 3 | 1 |

JARVIS, JUDICE & NINKE

FIG. 9C $\frac{1}{42} \times$
| | | ▨ | 8 | 4 |
|---|---|---|---|---|
| 2 | 4 | 8 | 4 | 2 |
| 1 | 2 | 4 | 2 | 1 |

STUCKI

FIG. 13

| GRAY SCALE VALUES | INDEX NO. | D0 | D1 | D2 | D3 | D4 | D5 | D6 | D7 | D8 | D9 |
|---|---|---|---|---|---|---|---|---|---|---|---|
| 0~D3X1−1 | 0 | | | | X | X | X | X | X | X | X |
| D3X1~D3X2−1 | 1 | | | | ● | X | X | X | X | X | X |
| D3X2~D3X3−1 | 2 | | | | X | ● | X | X | X | X | X |
| D3X3~D3X4−1 | 3 | | | | ● | ● | X | X | X | X | X |
| D3X4~D3X5−1 | 4 | | | | ● | X | ● | X | X | X | X |
| D3X5~D3X6−1 | 5 | | | | X | ● | ● | X | X | X | X |
| D3X6~D3X7−1 | 6 | | | | ● | ● | ● | X | X | X | X |
| D3X7~D3X8−1 | 7 | | | | ● | ● | X | ● | X | X | X |
| D3X8~D3X9−1 | 8 | | | | ● | X | ● | ● | X | X | X |
| D3X9~D3X10−1 | 9 | | BINARY | | X | ● | ● | ● | X | X | X |
| D3X10~D3X11−1 | 10 | | | | ● | ● | ● | ● | X | X | X |
| D3X11~D3X12−1 | 11 | | | | ● | ● | ● | X | ● | X | X |
| D3X12~D3X13−1 | 12 | | | | ● | ● | X | ● | ● | X | X |
| D3X13~D3X14−1 | 13 | | | | ● | X | ● | ● | ● | X | X |
| D3X14~D3X15−1 | 14 | | | | X | ● | ● | ● | ● | X | X |
| D3X15~D3X16−1 | 15 | | | | ● | ● | ● | ● | ● | X | X |
| D3X16~D3X17−1 | 16 | | | | ● | ● | ● | X | ● | ● | X |
| D3X17~D3X18−1 | 17 | | | | ● | ● | X | ● | ● | ● | X |
| D3X18~D3X19−1 | 18 | | | | ● | X | ● | ● | ● | ● | X |
| D3X19~D3X20−1 | 19 | | | | X | ● | ● | ● | ● | ● | X |
| D3X20~D3X21−1 | 20 | | | | ● | ● | ● | ● | ● | ● | X |
| D3X21~D3X22−1 | 21 | | | | ● | ● | ● | X | ● | ● | |
| D3X22~D3X23−1 | 22 | | | | ● | ● | X | ● | ● | ● | |
| D3X23~D3X24−1 | 23 | | | | ● | X | ● | ● | ● | ● | |
| D3X24~D3X25−1 | 24 | | | | X | ● | ● | ● | ● | ● | |
| D3X25~D3X26−1 | 25 | | | | ● | ● | ● | ● | ● | ● | |

FIG. 14

| CURRENT INDEX/INDEX ERROR | 0 | 1 | 2 | -1 | -2 |
|---|---|---|---|---|---|
| INDEX 14 (GROUP 2) | 2 | 2 | 2 | 2 | 2 |
| INDEX 15 (GROUP 1) | 1 | 1 | 1 | 1 | 1 |
| INDEX 16 (GROUP 5) | 5 | 5 | 5 | 5 | 5 |
| INDEX 17 (GROUP 4) | 4 | 4 | 4 | 4 | 4 |
| INDEX 18 (GROUP 3) | 3 | 3 | 3 | 3 | 3 |
| INDEX 19 (GROUP 2) | 2 | 2 | 2 | 2 | 2 |
| INDEX 20 (GROUP 1) | 1 | 1 | 1 | 1 | 1 |
| INDEX 21 (GROUP 5) | 5 | 5 | 5 | 5 | 5 |
| INDEX 22 (GROUP 4) | 4 | 4 | 4 | 4 | 4 |
| ... | ... | ... | ... | ... | ... |

METHOD AND APPARATUS FOR REMOVING FALSE CONTOURS

BACKGROUND OF THE INVENTION

This application claims the priority of Korean Patent Application No. 2002-75299, filed on Nov. 29, 2002, in the Korean Intellectual Property Office, the disclosure of which is incorporated herein in its entirety by reference.

1. Field of the Invention

The present invention relates to a method and apparatus for quickly removing false contours in a pulse number modulation (PNM) digital display device including a plasma display panel (PDP).

2. Description of the Related Art

In conjunction with the development of HDTV broadcasting, ultra-thin display devices, such as plasma display panels (PDPs) or digital micromirror devices (DMDs), have become more popular. Such matrix-type display panels can represent gray scales using a pulse number modulation (PNM) technique.

More specifically, in order to represent a moving picture on the screen of a display device, more than 24 picture frames should be consecutively displayed per each second. In addition, in order to represent a 24 bit-color picture (R: 8 bits×G: 8 bits×B: 8 bits), the amount of illumination should be regulated according to 256 (8-bit) gray scales. PDPs generally adopt a PNM technique where one field is divided into a plurality of subfields and the illumination of each of the subfields is controlled using a number of sustain pulses.

This type of PDP driving method works very well when dealing with still pictures. However, when encountering an occasion when a viewer's view point moves, the above PDP driving method may result in distortions of a picture displayed by a display device. This phenomenon is called false contours (of a moving picture). False contours could be generated depending on the extent of asynchronism between illumination and a result of multiplying the illumination time of pixels by the migration speed of the viewer's view point.

In other words, in a PNM-based method of representing gray scale, a subfield illumination point temporally varies in accordance with the variation of input gray scale. Therefore, the gray scale of a moving picture may have false contours that really do not exist on an original picture because of temporal variations of the subfield illumination point, while the gray scale of a still picture can be well represented without any distortions. In other words, the temporal variation of illumination is represented as a spatial variation, which results in false contours.

There are a few related art methods for addressing the problem of false contours, e.g., a method of selecting a combination of subfields for minimizing the variation of a subfield illumination pattern having a largest. illumination weight value, a method of inserting equalizing pulses into a predetermined area where false contours are anticipated to occur, and a method of scattering false contours.

In the method of selecting a combination of subfields, which has been disclosed in U.S. Pat. Nos. 6,268,890B1 and 6,310,588B1, false contours are prevented from occurring by arranging subfield illumination weight values in a monotonously increasing or decreasing manner and selecting a combination of the subfield illumination weight values that can prevent a subfield having a greatest illumination weight value from being turned on as much as possible. Even though it can prevent false contours from occurring to some extent by diffusing the variation of a subfield illumination distribution in a temporal direction, this method cannot completely prevent the variation of the subfield illumination distribution and thus, cannot effectively get rid of false contours. In addition, when the amount of motion is large, resulting in a large error, noise can be too easily detected through the error diffusion.

In the method of inserting equalizing pulses into a predetermined area where false contours are anticipated to have occurred, which is taught by Toda in U.S. Pat. No. 6,097, 368, false contours can be prevented from occurring by anticipating when a transition among subfields where false contours possibly occur will be generated inserting equalizing pulses before the moment of time when the transition is anticipated to occur. However, this method needs a sophisticated motion estimator to obtain precise equalizing pulses, which is a major setback to the implementation of this method. In order to prevent false contours in this method without using the motion estimator, there has been suggested a predetermined method in which a plurality of optimal equalizing pulse codes for a current gray scale are calculated off-line and stored in ROM and an optimal equalizing pulse code that results in as less false contours as possible, but there is still a clear limit in effectively removing false contours.

In the method of scattering false contours, which is taught by Watanabe in U.S. Pat. No. 6,088,012, false contours can be reduced by dividing a subfield having a heavier illumination weight into smaller subfields and placing the smaller subfields at positions before and after the subfield having a heavier illumination weight. However, this method may cause blurry moving pictures because it uses temporally distant, upper weights to represent a high brightness gray scale.

SUMMARY OF THE INVENTION

The present invention provides a method of removing false contours in a pulse-number-modulation (PNM) digital display device having a plasma display panel (PDP).

The present invention also provides an apparatus for removing false contours in a PNM digital display deice having a plasma display panel.

According to an aspect of the present invention, there is provided a method of removing false contours in a pulse number modulation (PNM) digital display device, in which predetermined pixel data currently being processed in a current frame (hereinafter, referred to as input data) is compared with corresponding pixel data in a previous frame (hereinafter, referred to as comparison data), it is determined, based on a result of the comparison, whether or not false contours have occurred, and the input data is modulated and output so that the false contours can be removed. The method involves a) comparing the input data with the comparison data and calculating a plurality of possible output data in consideration of an index error between the input data and error-diffused input data so that the false contours can be removed, the error-diffused input data being obtained by diffusing a quantization error that has occurred in pixels adjacent to the input data in the current frame; b) detecting an index error between the input data and the error-diffused input data; and c) selecting one from among the plurality of possible output data obtained in step a) in consideration of the index error detected in step b).

According to another aspect of the present invention, there is provided an apparatus for removing false contours in a PNM digital display device, which compares pixel data currently being processed in a current frame (hereinafter, referred to as input data) with corresponding pixel data in a previous frame (hereinafter, referred to as comparison data), determines, based on a result of the comparison, whether or not false contours have occurred, and modulates and outputs the input data so that the false contours can be removed. The apparatus includes a quantization and output data unit, an error detection unit, and a multiplexing unit. The quantization and output data unit compares the input data with the comparison data and calculates a plurality of possible output data in consideration of an index error between the input data and error-diffused input data so that the false contours can be removed, the error-diffused input data being obtained by diffusing a quantization error that has occurred in pixels adjacent to the input data in the current frame. The error detection unit detects an index error between the input data and the error-diffused input data. The multiplexing unit selects one from among the plurality of possible output data obtained by the quantization and output data unit in consideration of the index error detected by the error detection unit.

BRIEF DESCRIPTION OF THE DRAWINGS

The above and other features and advantages of the present invention will become more apparent by describing in detail exemplary embodiments thereof with reference to the attached drawings in which:

FIGS. 9A through 9C are diagrams illustrating different examples of the operation of an error diffusion filter 802 of FIG. 8 in a matrix form;

FIG. 13 is a table showing variations of subfields of a PDP to which a method and apparatus for removing false contours according to a preferred embodiments are applied;

FIG. 14 is an error table used in a process of anticipating output data, shown in FIG. 12, on the assumption that a maximum index error is ±2.

DETAILED DESCRIPTION OF THE INVENTION

Hereinafter, the present invention will be described more fully with reference to the accompanying drawings in which exemplary embodiments of the invention are shown.

Figure 1:
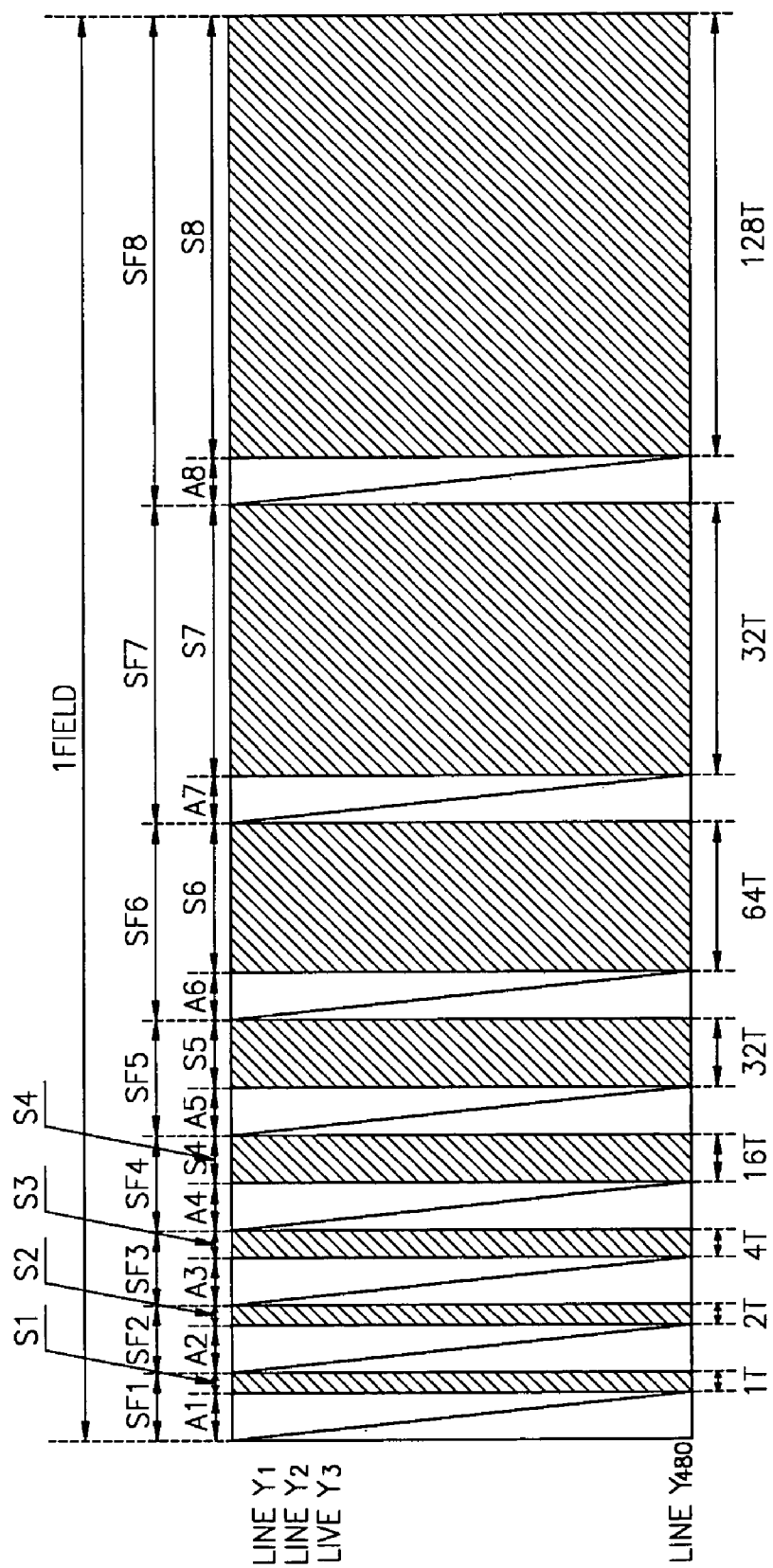
FIG. 1 is a diagram illustrating a method of representing the gray scale of a plasma display panel (PDP)

FIG. 1 is a diagram illustrating a method of representing the gray scale of a plasma display panel (PDP). In FIG. 1, the X-axis corresponds to time, and the Y-axis corresponds the number of horizontal scan lines. More specifically, FIG. 1 illustrates an 8-bit gray scale realization method in which one field is divided into 8 subfields and an addressing period and a sustain period are specified for each subfield.

During an addressing period, electrically signalized information is written by forming a wall charge at a pair of display electrodes in a predetermined area on the screen of a PDP through selective discharge using a write pulse between an address electrode and a scan electrode crossing each other.

During a sustain period, light is emitted to generate image information on the screen through discharge caused by consecutive sustain pulses between the pair of display electrodes. The duration of the sustain period for each of the subfields of FIG. 1 has a ratio of 1:2:4:8:16:32:64:128.

The gray scale of a PDP can be realized in the following manner. The subfields are selectively illuminated, and then the amount of light emitted from the illuminated subfields is accumulated in our eyes so that we can perceive the gray scale of a PDP as average illumination. For example, in order to achieve a gray scale of 3, a subfield whose sustain period lasts as long as 1 T and a subfield whose sustain period lasts as long as 2 T need to be illuminated so that the sum of their sustain periods can be 3 T. Then, our eyes can perceive a gray scale of 3 realized by the amount of light exposed for as long as 3 T.

In the same manner, a gray scale of 127 can be achieved by illuminating subfields whose respective sustain periods are 1 T, 2 T, 4 T, 16 T, 32 T, and 64 T. By doing so, a illumination of 127 is obtained by the amount of light exposed for as long as 127 T. Therefore, according to the above method, a total of 256 gray scales (28=256) can be represented when using 8 subfields.

Figure 2A:
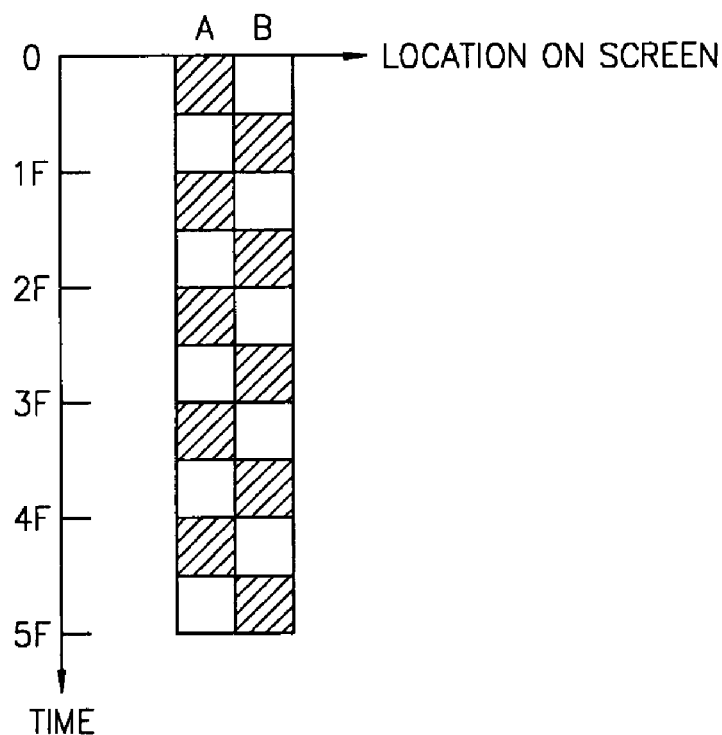
FIGS. 2A through 2C are graphs illustrating how human eyes perceive the gray scale of a still picture.
Figure 2B:
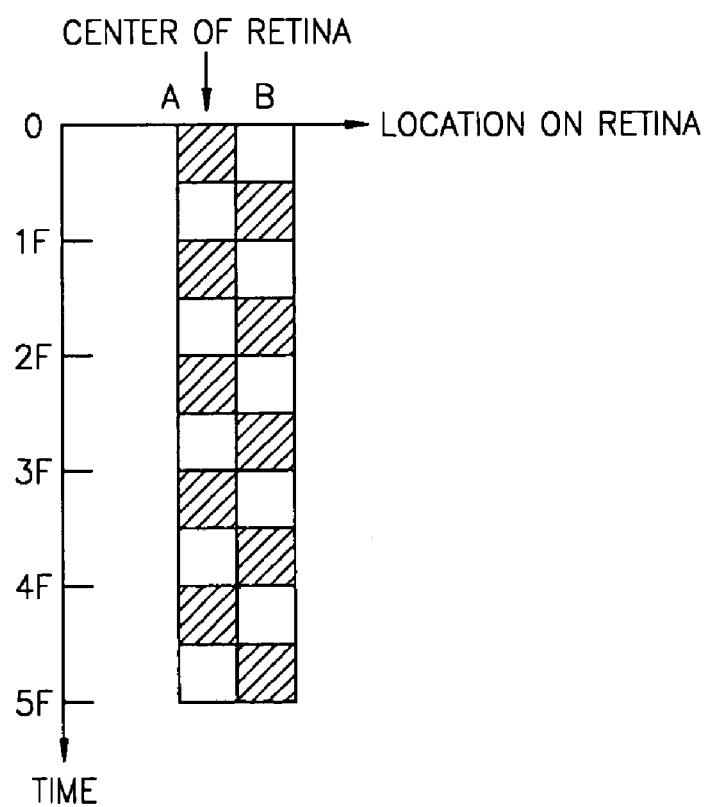
Figure 2C:
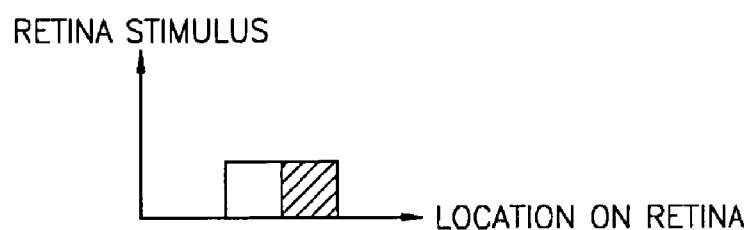

FIGS. 2A through 2C are graphs illustrating how human eyes can perceive a gray scale of a still picture. In FIGS. 2A through 2C, let us assume that pixels A have an illumination of 127 and pixels B have an illumination of 128.

As shown in FIG. 2A, a pixel illumination of 127 can be achieved by illuminating all eight subfields except the one whose sustain period is 128 T, and a pixel illumination of 128 can be achieved by illuminating only the subfield whose sustain period is 128 T. When seeing a still picture, as shown in FIG. 2B, human eyes can perceive light staying at a predetermined area on the retina for a predetermined period of time, as shown in FIG. 2B. Therefore, as shown in FIG. 2C, the pixels A and B respectively having a illumination of 127 and a illumination of 128 can be well perceived.

Figure 3:
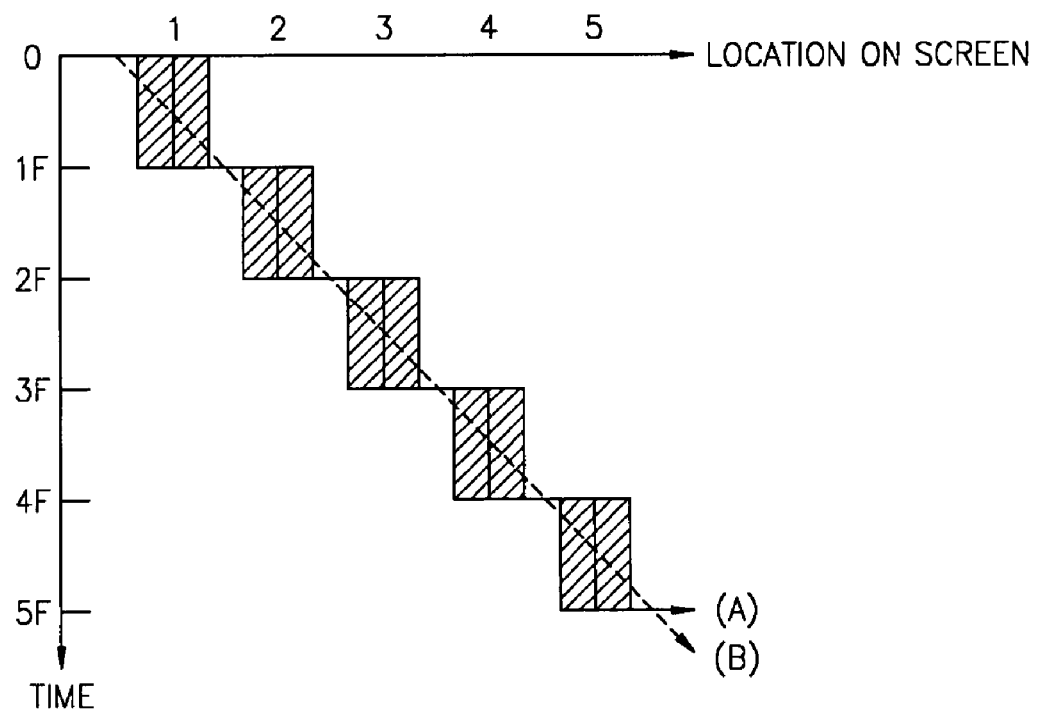
FIGS. 3, 4A and 4B are graphs illustrating how human eyes perceive the gray scale of a moving picture.
Figure 4A:
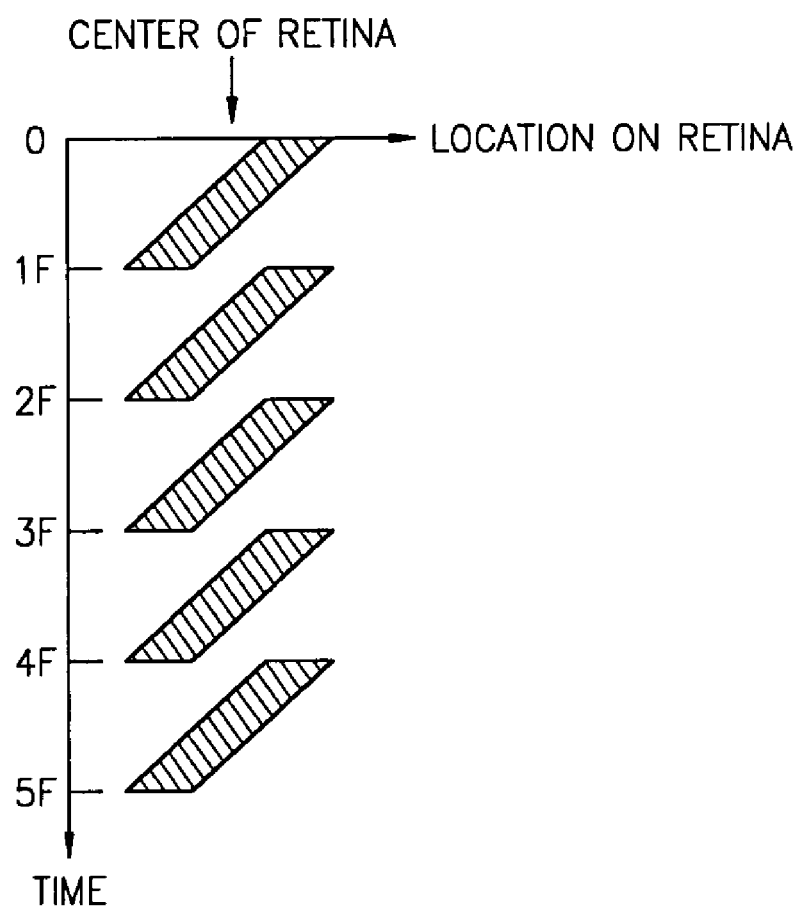
Figure 4B:
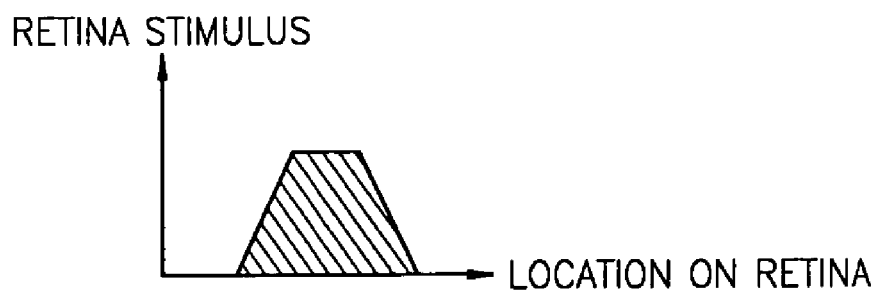

FIGS. 3, 4A and 4B are diagrams illustrating how human eyes can perceive a gray scale of a moving picture. Referring to FIG. 3, as a pixel moves along the sequence of 1, 2, 4, 8, . . . , human eyes instinctively follow the pixel.

Unlike the pixel, however, human eyes move linearly. A trajectory of their movement can be represented by a dotted line (B) of FIG. 3. In addition, the shape of a retina image of the pixel is illustrated in FIG. 4A, and the distribution of illumination of the retina image of the pixel is illustrated in FIG. 4B.

Figure 5:
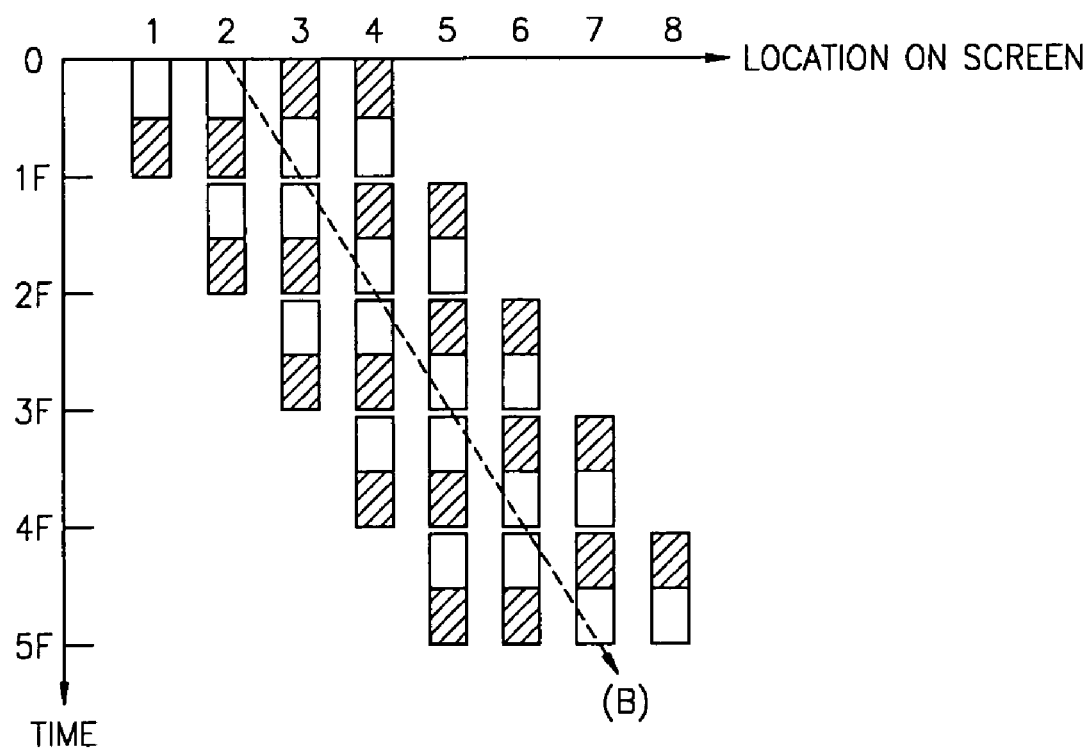
FIGS. 5, 6A and 6B are graphs showing the illumination of an image perceived by human eyes when they see pixels having a gray scale of 128 and a gray scale of 127 moving from the left to the right.
Figure 6A:
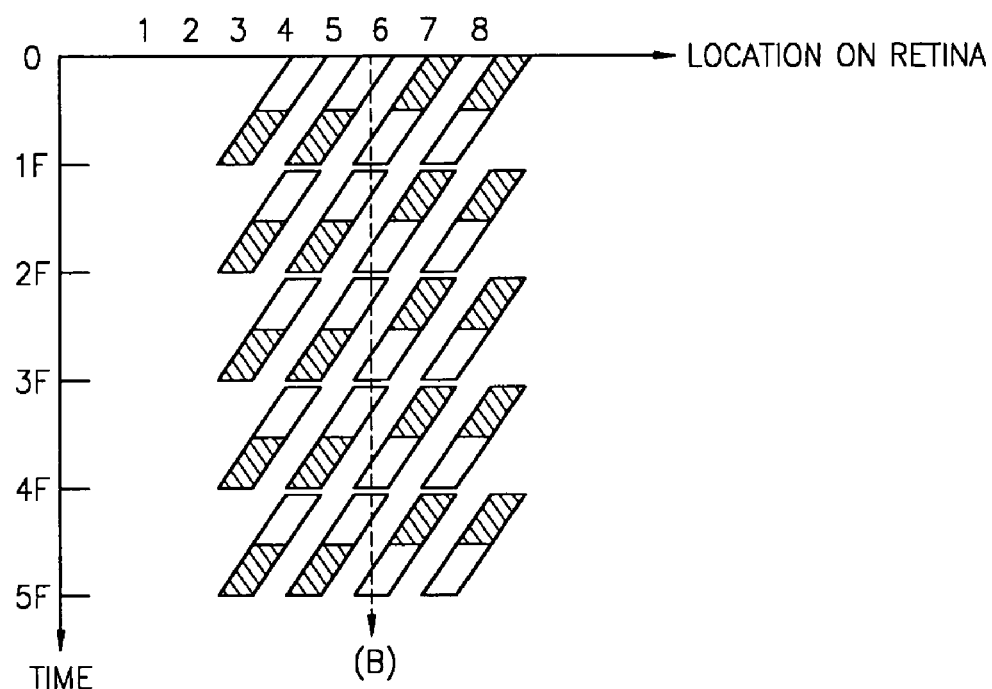
Figure 6B:
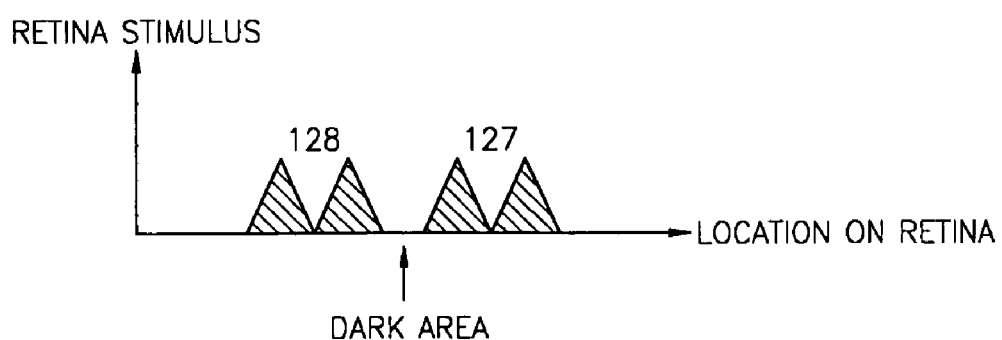

FIGS. 5, 6A and 6B illustrate illumination of an image perceived by human eyes when they see pixels respectively having a gray scale of 128 and a gray scale of 127 moving from the left to the right. As shown in FIG. 5, the lower half of first and second illumination cells, which corresponds to a 128 T subfield, is illuminated while the upper half corresponding to 1 T through 64 T subfields is turned off. Therefore, the first and second illumination cells have a gray scale of 128. On the other hand, the upper half of third and fourth illumination cells is illuminated while the lower half is turned off. Therefore, the third and fourth illumination cells have a gray scale of 127. In FIG. 5, slant lines represent an illuminated portion of each illumination cell.

Human eyes move along a slant line direction, i.e., a direction marked by 'B', and thus the distribution of illumination of a retina image of the illumination cells is the same as the one shown in FIG. 6A. As shown in FIG. 6A, there exists a discontinuous surface in the distribution of the illumination of the retina image. Thus, visual stimuli on the retina can be illustrated as shown in FIG. 6B. As shown in FIG. 6B, a dark area exists between a gray scale of 128 and a gray scale of 127.

Then, human eyes perceive the dark area between a gray scale of 128 and a gray scale of 127 as if a dark band having a gray scale of 0 existed in the middle of an area whose gray scale level gradually decreases from 128 to 127. Such a dark band that really does not exist but happens to be perceived by human eyes when they see pixels moving from side to side is called a false contour. The same principle can also be applied to an occasion when the illumination of pixels gradually increases from 127 to 128, in which case a bright band having a gray scale of 255 can be perceived somewhere between a gray scale of 127 and a gray scale of 128.

Figure 7:
FIG. 7 is a block diagram of a typical PDP driver.

FIG. 7 is a block diagram of a typical PDP driver. Referring to FIG. 7, an image signal input unit 700 separates image signals from complex image signals. An analog/digital conversion unit 710 converts analog image signals separated from the complex image signals into digital image signals.

A gamma compensation unit 720 corrects image signals that have been processed to be suitable for a cathode ray tube (CRT) into those suitable for a PDP. A false contour removal unit 730 adjusts a gray scale of input image signals so that the possibility of occurrence of false contours can be minimized. A display driving unit 740 displays data output from the false contour removal unit 730 to the PDP.

Figure 8:
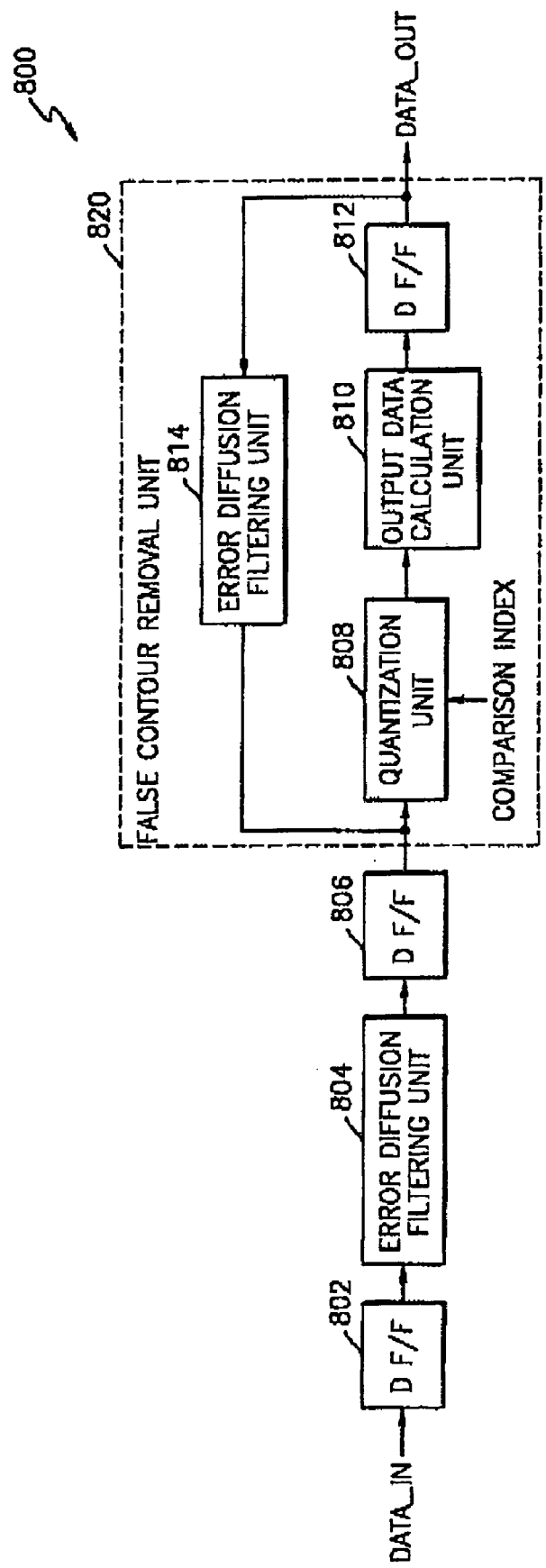
FIG. 8 is a block diagram of a related art apparatus for removing false contours.

FIG. 8 is a block diagram of a related art apparatus 800 for removing false contours. The apparatus 800 compares the pattern of illumination of subfields corresponding to pixel data currently being processed in a current frame (hereinafter, referred to as input data) with the pattern of illumination of subfields corresponding to pixel data in a previous frame (hereinafter, referred to as comparison data) and determines whether or not false contours have occurred, depending on a comparison result (here, the input data and the comparison data correspond to the same pixels in different frames). Thereafter, if false contours have occurred, the apparatus 800 removes them by modulating the input data and outputting the modulated input data.

Given that which subfields are to be illuminated or not illuminated is determined depending on the gray scale of pixel data. Therefore, the pattern of illumination of subfields, mentioned above, indicates the pattern of distribution of illuminated or non-illuminated subfields according to the gray scale of the pixel data. As the gray scale of the pixel data varies, the pattern of illumination of subfields also varies. Variations of the pattern of illumination of subfields can be represented in the form of a table, which is called a subfield variation table. In addition, gray scales corresponding to the subfield illumination pattern variations can be grouped, and a serial number can be allotted to each gray scale group. A serial number of each gray scale group is represented by an index. Therefore, each gray scale group corresponds to an index and a subfield illumination pattern.

In the modulation of the input data, a subfield illumination pattern similar to the one corresponding to the comparison data is selected, a gray scale corresponding to the selected subfield illumination pattern is selected, and the selected subfield illumination pattern and the selected gray scale are output as output data. In order to minimize the influence of a difference between the input data and output data, i.e., quantization error, the quantization error is diffused throughout the vicinity of pixels in the same frame as the input data.

The apparatus 800 includes a false contour removal unit comprised of a quantization unit 808, a output data calculation unit 810, and a second error diffusion filter 814.

Referring to FIG. 8, input data (DATA_IN) is stored in a D flipflop 802. A first error diffusion filter 804 carries out error diffusion filtering so that error occurring in the vicinity of the input data in a previous scan line can be reflected into the input data and stores a result of the error diffusion filtering in a D flip flop 806.

FIGS. 9A through 9C are diagrams illustrating different examples of the operation of the error diffusion filter 802 in a matrix form. Error diffusion is a process of mitigating the influence of a pixel's quantization error by diffusing the quantization error to adjacent pixels. A pixel's quantization error, which is defined by a difference between a pixel value and a corresponding quantized pixel value, is generally diffused to four adjacent pixels along a rightward direction and along a downward direction.

FIGS. 9A through 9C illustrate three different error weight matrices, respectively, i.e., a Floyd & Steinberg filter's, a Jarvis, Judice & Ninke filter's, and a Stucki filter's, respectively.

For example, as shown in FIG. 9A, a Floyd & Steinberg filter diffuses error of a pixel currently being processed to four adjacent pixels.

Figure 10:
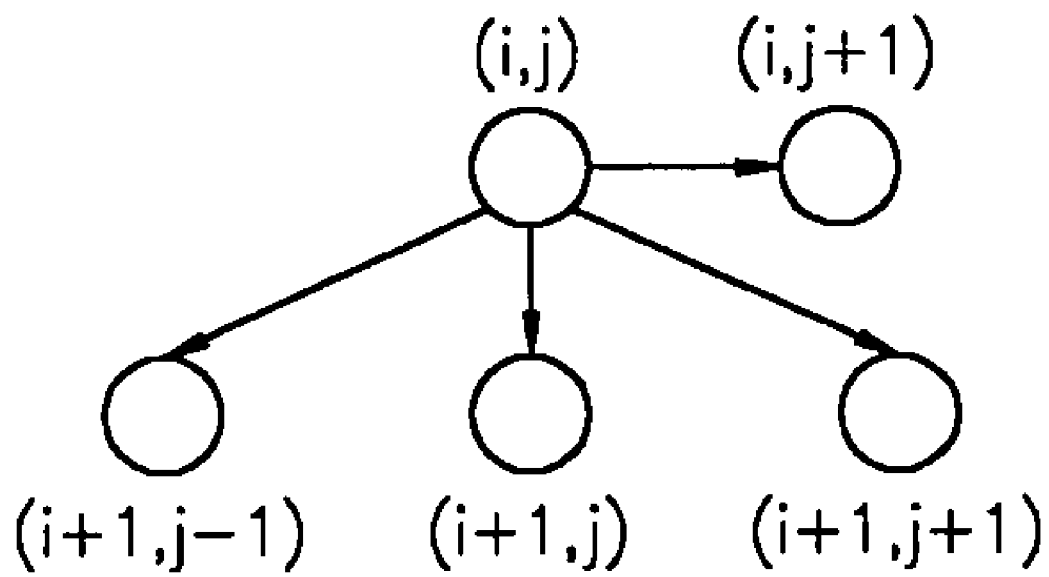
FIG. 10 is a diagram illustrating the operation of a Floyd & Steinberg filter of FIG. 8.

FIG. 10 is a diagram illustrating an example of the operation of the error diffusion filter 802 of FIG. 8 when the error diffusion filter 802 is a Floyd & Steinberg filter. As shown in FIG. 10, the error diffusion filter 802 diffuses error of a pixel at (i, j), currently being processed, to four adjacent pixels by distributing seven sixteenths of the error to a pixel at a location (i, j+1), one sixteenth to a pixel at (i+1, j−1), five sixteenths to a pixel at (i+1, j), and three sixteenths to a pixel at (i+1, j+1).

The quantization unit 808 determines whether or not false contours have occurred and selects an appropriate subfield illumination pattern for removing false contours. More specifically, the quantization unit 808 compares an index of a subfield illumination pattern corresponding to the input data (hereinafter, referred to as an input index) with an index of a subfield illumination pattern corresponding to the comparison data (hereinafter, referred to as a comparison index and determines that false contours have occurred if the two indexes are different. If false contours have occurred, the quantization unit 808 selects an index of an optimal subfield illumination pattern for removing false contours (hereinafter, referred to as an output index) and outputs the selected index.

It is determined whether or not false contours have occurred by comparing the subfield illumination patterns corresponding to the input data and the comparison data, respectively, and more specifically, by comparing the input index with the comparison index.

In other words, each pair of a value of the input index and a value of the comparison index, for which false contours may occur, is identified in advance, and an output index appropriate for each of the ordered pairs is determined. Thereafter, correlations among the input index, the comparison index, and the output index are stored in a comparison table. The quantization unit 812 selects an output index from the comparison table by referring to the input index and the comparison index.

Here, quantization indicates a process of obtaining an index of a subfield illumination pattern corresponding to input data. This process involves classifying an arbitrary gray scale into one of a plurality of binary gray scale groups, which is why we call quantization here in this disclosure. This process, however, could be called mapping.

Figure 11:
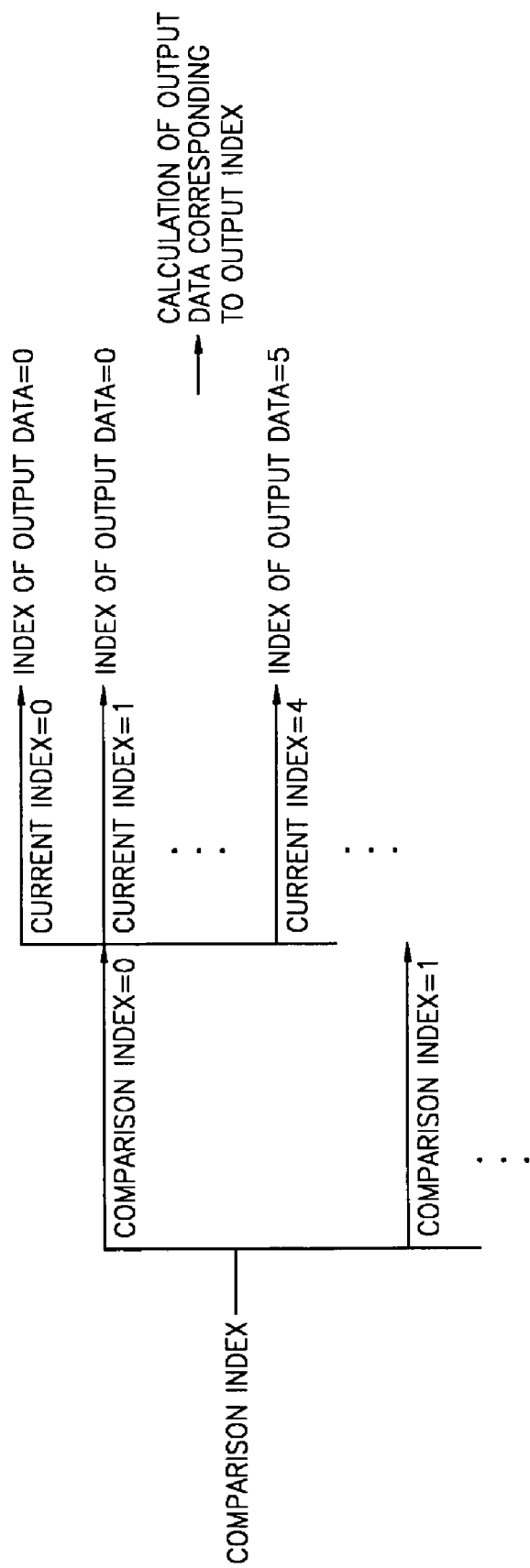
FIG. 11 is a diagram illustrating an example of a comparison table that shows a correlation among an input index, a comparison index, and an output index.

FIG. 11 is a diagram illustrating an example of a comparison table showing correlations among an input index, a comparison index, and an output index.

Referring to FIG. 11, if the comparison index and the input index have a value of '0', the output index is set to '0'. In other words, when the comparison index and the input index have the same value, a subfield illumination pattern corresponding to input data and a subfield illumination pattern corresponding to comparison data are the same. In this case, it is determined that false contours have not occurred, and thus there is no need to modulate input data.

On the other hand, if the comparison index has a value of '0' and the input index has a value of '4', the output index is set to '5'. Since the subfield illumination pattern corresponding to the input data and the subfield illumination pattern corresponding to the comparison data are not the same, it is determined that false contours have occurred. Therefore, there is a need to select and output an optimal subfield illumination pattern for removing the false contours, i.e., an index of 5.

The output data calculation unit 810 calculates output data corresponding to the output index provided by the quantization unit 808. There could be a plurality of gray scales that can be represented by a single subfield illumination pattern. Therefore, when converting the output index into the output data, it is necessary to select one of a plurality of gray scales corresponding to the output index.

There could be various methods for selecting one of a plurality of gray scales corresponding to the output index. Among those methods, a method of adding several lower bits to the output index could be the most effective one. For example, when the output index is 2, i.e., '01' in binary notation, output data having a gray scale of 16 can be obtained by attaching three bits '111' to '01' so as to make '01111'.

The output of the output data calculation unit 810 is stored in the D flipflop 812 and is provided to the error diffusion filter 814 as the output data.

If there exists a false contour between the input data and the comparison data, the output data is supposed to have a different value from its original value due to the operation of the quantization unit 808 and the output data calculation unit 810. In other words, the output data has a quantization error. Thus, it is necessary to minimize the influence of the quantization error by diffusing the quantization error to the pixels adjacent to the pixel currently being processed in the same frame.

The error diffusion filter 814 diffuses the quantization error in the output data to the pixels adjacent to the pixel currently being processed in the same frame.

As described above, the apparatus 800 diffuses the quantization error of the output data to the pixels adjacent to the pixel currently being processed in the same frame, determines an output index based on a result of comparing the input index with the comparison index, and calculates output data corresponding to the determined output index. Due to the characteristics of a system, the apparatus should carry out the above processes at only one pixel clock.

In addition, the apparatus 800 of FIG. 8 should sequentially carry out the above processes, including making a feedback of the output data, in a predetermined order, and thus it takes the apparatus 800 a long time to complete the above processes. Therefore, it is almost impossible for the apparatus 800 to have an operation frequency high enough to process high-quality pictures, such as HDTV data.

Figure 12:
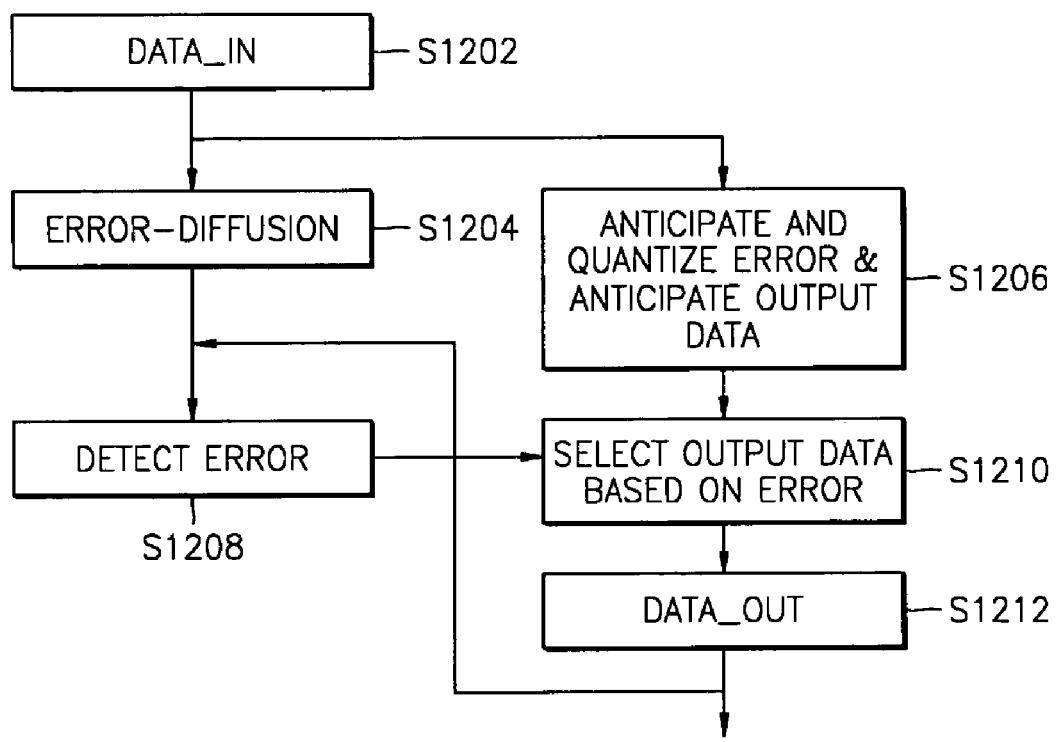
FIG. 12 is a flowchart of a method of removing false contours according to a preferred embodiment of the present invention.

FIG. 12 is a flowchart of a method of removing false contours according to an exemplary embodiment of the present invention. In the method of removing false contours, all possible output data that correspond to a predetermined pair of input data and comparison data within a predetermined error bound are calculated in advance, and one of them is selected and output by referring to an error between an input index and a comparison index.

In other words, all possible output data for predetermined input data within a predetermined error bound are calculated in advance, which results in enhanced operation speed. In the method of removing false contours according to an exemplary embodiment of the present invention, unlike in the operation of the related art apparatus for removing false contours of FIG. 8, operation speed can be increased by carrying out all needed processes in parallel, which involves diffusing a quantization error to pixels adjacent to a pixel currently being processed by making a feedback of a quantization error of output data, determining an output index depending on a result of comparing an input index with a comparison index, and calculating output data corresponding to the determined output index. Therefore, according to the present invention, it is possible to process images of high frequency.

Referring to FIG. 12, input data is received in step S1202. In step S1204, error diffusion is carried out upon the received input data. The error diffusion helps reflect quantization errors occurring in pixels adjacent to one another in the same frame into the received input data.

In step S1206, a plurality of output data that possibly exist within an error bound between the input data and comparison data are anticipated. Steps S1204 and S1206 are carried out in parallel.

In step S1208, an index error between the original input data and the error-diffused input data (obtained in step S1204) is detected. Removal of false contours is mainly based on a result of comparing the input data with the comparison data, but it should also consider the extent to which the error diffusion affects the input data. In other words, if removal of false contours is carried out only based on the result of the comparison of the input data with the comparison data, false contour components that could be generated due to an error between the original input data and the error-diffused input data cannot be removed.

Therefore, in the present invention, the plurality of possible output data are anticipated based on the result of the comparison of the original input data with the comparison data, and then final output data is determined based on the index error between the original input data and the error-diffused input data.

In step S1210, one of the plurality of output data anticipated in step s1206 is selected based on the index error detected in step S1208.

In step S1212, the selected output data is output.

FIG. 13 is a subfield variation table used for a PDP that adopts a method and apparatus for removing false contours according to an exemplary embodiment of the present invention.

In the subfield variation table of FIG. 13, subfield weight values D0 through D2 satisfy the following equation:

D0+D1+D2+1=D3. Subfield weight values D3, D4 and D5 are in arithmetical progression, satisfying the following equations: D4=D3+d, D5=D4+d, and D6=D5+d. For example, D3 may have a value of 8.

When it comes to subfield weight values D7, D8 and D9, subfields are constructed to have the same weight value, satisfying the following equation: D7=D8=D9=D6+d.

Under these conditions, subfields can be constructed in various manners. For example, if there are 10 subfields provided, a ratio among their values could be 1:2:4:8:16:24:32:40:40:40. If there are 11 subfields provided, a ratio among their values could be 1:2:4:8:16:24:32:40:40:40:40.

As shown in the subfield variation table of FIG. 13, whether the upper illumination blocks D3 through D9 are turned on or off have a considerable influence on whether false contours will be generated or not, and in accordance with the increase of gray scale, their illumination has a regular and repetitive pattern. The illumination blocks D3 through D6, in particular, clearly have the regularity. In other words, after index 6, the illumination blocks D3 through D6 show regular repetitions of 5 subfield illumination patterns, which means that subfield illumination patterns corresponding to indexes 6, 11, 16, and 21 are similar.

This type of similarity could be very useful for selecting an output index to remove false contours. For example, if an input index has a value of 18 and a comparison index has a value of 16, then it is determined that false contours exist. Therefore, in order to remove the false contours, input data needs to be modulated. Subfield illumination patterns corresponding to Index 6, 11, and 21 and comparison index 16 could be selected as candidates for output data. Sets of similar subfield illumination patterns in FIG. 13 are as follows.

1) Subfield illumination patterns corresponding to indexes 10, 15, 20 and 25
2) Subfield illumination patterns corresponding to indexes 9, 14, 19 and 24
3) Subfield illumination patterns corresponding to indexes 8, 13, 18 and 23
4) Subfield illumination patterns corresponding to indexes 7, 12, 17 and 22
5) Subfield illumination patterns corresponding to indexes 6, 11, 16 and 21

FIG. 14 is an example of an error table used in the anticipation of output data of FIG. 12 on the assumption that a maximum index error is ±2.

As shown in FIG. 14, take index 18, for example. Then, output indexes corresponding to all indexes ranging from index 14, which is a fourth lower than index 14, to a fourth upper index, which is a fourth upper than index 14, are calculated in advance, and then an error table is created based on the calculation results.

More specifically, if an index error is '0', indexes ranging from a second lower than an input index to a second upper than the input index are selected as candidates for an output index because an index error of 0 indicates that there is no difference between input data and error-diffused input data.

If the index error is '1', indexes ranging from a second lower than a predetermined index to a second upper than the predetermined index are selected as candidates for an output index. Here, the predetermined index is a first upper or lower than the input index. An index error of 1 indicates that the difference between the input data and the error-diffused input data is 1.

A method of determining an output index using the error table of FIG. 14 will be described in the following paragraphs.

First of all, it is necessary to consider under what conditions the output index should be selected. Those conditions are as follows.

1) If false contours have occurred, as much similar an index to a comparison index as possible is selected as an output index.

2) if there are more than one indexes similar to the comparison index, the one within an error bound is selected as the output index.

For example, if index 18 and index 16 are an input index and a comparison index, respectively, and an index error is 0, index 16 is determined as an output index. More specifically, when an index error is 0, removal of false contours is carried out solely based on a result of comparing input data and error-diffused input data. In this case, the input data only needs to be modulated so that the input index and the comparison index can be similar to each other. Therefore, an index very similar to the comparison index is selected as the output index.

As described above, the subfield illumination patterns corresponding to indexes 6, 11 and 21 are very similar to the one corresponding to the comparison index 16, i.e., index 16. Therefore, indexes 6, 11, 16, and 21 are selected as candidates for an output index. However, in the end, only index 16 is determined as an output index because there is nothing but index 16 within an error bound of 0 from the comparison index.

On the other hand, if index 18 and index 16 are an input index and a comparison index, respectively, and an index error is 2, index 21 is determined as an output index because an index error of 2 indicates that an index error between the input data and the error-diffused data is 2 and that output data exists within a ±2 error bound from index 20. As shown in FIG. 13, among all indexes within the ±2 error bound from index 20, only index 21 has a similar subfield illumination pattern to that of the comparison index. Therefore, index 21 is determined as an output index.

In the error table of FIG. 14, subfield illumination patterns are classified into five groups, i.e., groups 1 through 5, depending on their similarity to one another, and thus readability can be enhanced.

The five groups are as follows.

Group 1: subfield illumination patterns corresponding to indexes 10, 15, 20 and 25
Group 2: subfield illumination patterns corresponding to indexes 9, 14, 19 and 24
Group 3: subfield illumination patterns corresponding to indexes 8, 13, 18 and 23
Group 4: subfield illumination patterns corresponding to indexes 7, 12, 17 and 22
Group 5: subfield illumination patterns corresponding to indexes 6, 11, 16 and 21

For example, index 16 is classified into group 5, and index 18 is classified into group 3. In order to remove false contours, input data is preferably modulated so that it can have as similar a subfield illumination pattern to a comparison subfield illumination pattern as possible. Therefore, when index 16 is a comparison index, an index belonging to the same group as index 16 is preferably determined as an output index.

In the error table of FIG. 14, conditions under which an output index is determined with reference to each of groups 1 through 5 are as follows.

1) If false contours have occurred, an index in the same group as a comparison index is determined as an output index.

2) if there are more than one indexes in the same group as the comparison index, the one that exists within a predetermined error bound is determined as an output index.

For example, as shown in FIG. 13, if an input index is index 18, a comparison index is index 16, and an index error is 0, index 16 is determined as an output index. More specifically, when an index error is 0, removal of false contours is carried out solely based on a result of comparing input data and error-diffused input data. In this case, the input data only needs to be modulated so that the input index and the comparison index can be similar to each other. Therefore, an index very similar to the comparison index is selected as the output index. The comparison index, i.e., index 16, belongs to group 5. Since nothing but index 16 is within an error bound of 0 from index 16, index 16 is determined as an output index.

On the other hand, if index 18 and index 16 are an input index and a comparison index, respectively, and an index error is 2, index 21 is determined as an output index because an index error of 2 indicates that an index error between the input data and the error-diffused data is 2 and that output data exists within a ±2 error bound from index 20. Among all indexes within the ±2 error bound from index 20, only index 21 has a similar subfield illumination pattern to that of the comparison index. Therefore, index 21 is determined as an output index.

In short, since an error bound needs to be considered in determining an output index, indexes adjacent to an input index should be selected as candidates for the output index, and among those candidates, indexes belonging to the same group as a comparison index are searched for.

The method of determining an output index could be explained in a different manner without using the concept of an error bound as follows. First of all, indexes which are adjacent to an input index and belong to the same group as a comparison index are searched for. Among the searched indexes, the closest one to the input index is selected as an output index.

Grouping of subfield illumination patterns is preferably carried out in consideration of a maximum allowable error bound. For example, if a maximum allowable error bound is ±2, the subfield illumination patterns could be grouped into as many groups as the number of error values within the maximum allowable error bound, i.e., 5 groups, because the maximum allowable error bound includes five error values, i.e., −2, −1, 0, +1, and +2.

In addition, output data corresponding an output index determined in the above-described manner can be determined in advance. For example, if index 18 is an input index and an error is '0', an output index for the input index is index 16, and output data corresponding to the output index is 1128 (16*8) on the assumption that the output index is obtained by dividing the output data by 8. If the error is 1, final output data is 168 (21*8).

Figure 15:
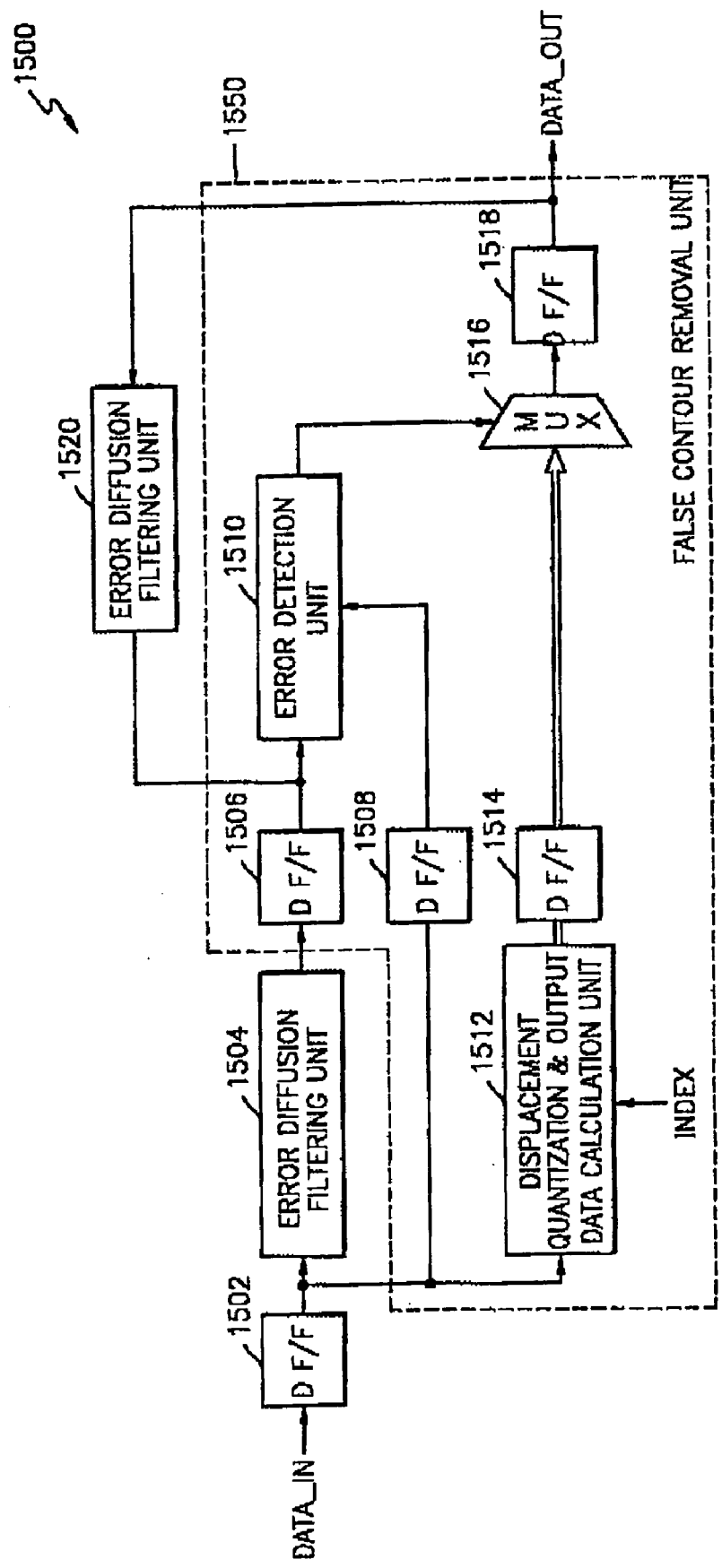
FIG. 15 is a block diagram of an apparatus for removing false contours according to an exemplary embodiment of the present invention.

FIG. 15 is a block diagram of an apparatus for removing false contours according to an exemplary embodiment of the present invention. Referring to FIG. 15, an apparatus 1550 for removing false contours includes a first error diffusion filtering unit 1504, an error detection unit 1510, a displacement quantization and output data calculation unit 1512, a multiplexing unit 1516, an output data calculation unit 1518, and a second error diffusion filtering unit 1522.

More specifically, input data is stored in a D flipflop 1502. The first error diffusion unit 1504 performs error diffusion filtering on the input data stored in the D flipflop 1502 by referring to output data of a previous line and stores a result of the error diffusion filtering in a D flipflop 1506. The input data stored in the D flipflop 1502 is also stored in a D flipflop 1508.

The second error diffusion filtering unit 1520 carries out error diffusion filtering on the output of the D flipflop 1508.

The error detection unit 1510 detects a difference, i.e., an index error, between the error-diffused input data obtained by the first and second error diffusion filtering units 1504 and 1520 and the input data stored in the D flipflop 1508.

The displacement quantization and output data calculation unit 1512 anticipates possible errors between the input data stored in the D flipflop 1502 and comparison data and calculates and outputs a plurality of output data for the anticipated errors. The output data output from the displacement quantization and output data calculation unit 1512 is stored in the D flipflop 1510.

For example, supposing that a maximum allowable range of errors between the input data and the error-diffused input data is ±2, the displacement quantization and output data calculation unit 1512 calculates an output index and output data in consideration of the maximum allowable error range. In other words, an error table composed of errors within the maximum allowable error range and corresponding output indexes and output data is composed, and final output data is determined by using the error table with reference to the detected index error between the input data and the error-diffused input data.

The error detection unit 1510 compares the input data with the error-diffused input data and detects the index error therebetween. The error-diffused input data is obtained by the first and second error diffusion filtering units 1504 and 1520. The first error diffusion filtering unit 1504 diffuses a quantization error, which has occurred in a previous line of a current frame where input data belongs to, to the input data, and the second error diffusion filtering unit 1520 diffuses a quantization error, which has occurred in a current line of the current frame, to the input data.

The index error detected by the error detection unit 1510 is applied to the multiplexing unit 1516. The multiplexing unit 1516 selects output data corresponding to the detected index error from among a plurality of output data stored in a D flipflop 1514 and outputs the selected output data. The output data obtained by the multiplexing unit 1516 is provided to the display driving unit (740 of FIG. 7) and the second error diffusion filtering unit 1520.

In the apparatus 1500 of FIG. 15, the displacement quantization and output data calculation unit 1512 operates in accordance with the first error diffusion filtering unit 1504 and hardly affects delay caused by the operation of the second error diffusion filtering unit 1520. Therefore, the apparatus 1500 of FIG. 15, like the apparatus of FIG. 8, can considerably enhance operation speed, as compared with the prior art where error diffusion, quantization, and calculation of output data are sequentially carried out.

The above-described embodiments of the present invention can be written as programs including instructions that can be executed in a computer and can be realized in a common digital computer with the help of a computer-readable recording medium. In addition, the above-described embodiments of the present invention can be written on the computer-readable recording medium in a variety of manners. The computer-readable recording medium includes a magnetic storage medium, such as ROM, a floppy disk, or a hard disk, an optical recording medium, such as CD-ROM or a DVD, and a carrier wave, such as data transmission through the Internet.

As described above, the method of removing false contours according to the present invention can achieve high enough operation speed to deal with high quality images by calculating a plurality of possible output data in consideration of a given error bound and selectively output the one corresponding to a detected error.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of removing false contours in a pulse number modulation (PNM) digital display device, in which predetermined pixel data processed in a current frame (hereinafter, referred to as input data) is compared with corresponding pixel data in a previous frame (hereinafter, referred to as comparison data), wherein it is determined, based on a result of the comparison, whether or not false contours have occurred, and the input data is modulated and output so that the false contours are removed, the method comprising:
   a) comparing the input data with the comparison data and calculating a plurality of possible output data in consideration of an index error between the input data and error-diffused input data so that the false contours are removed, the error-diffused input data being obtained by diffusing a quantization error that has occurred in pixels adjacent to the input data in the current frame;
   b) detecting an index error between the input data and the error-diffused input data;
   c) selecting one from among the plurality of possible output data obtained in a) in consideration of the index error detected in b); and
   d) sending the selected output data to a display driving unit of said digital display device to display the input data without fuse contours.

2. The method of claim 1, wherein the index error corresponds to a difference between an index of a subfield illumination pattern corresponding to the input data (hereinafter, referred to as an input index) and an index of a subfield illumination pattern corresponding to the comparison data (hereinafter, referred to as a comparison index).

3. The method of claim 1, further comprising:
   d) diffusing a quantization error that has occurred in pixels adjacent to the input data in a previous line of the current frame to the input data.

4. The method of claim 3, further comprising:
   e) diffusing a quantization error that has occurred in pixels adjacent to the input data in a current line of the current frame to a result of the error diffusion carried out in d),
   wherein in b), an index error between the input data and the error-diffused input data obtained by carrying out d) and e) is detected.

5. The method of claim 1, wherein subfield illumination patterns are classified into a plurality of groups depending on their similarity to one another, and in c), indexes belonging to the same group as the comparison index are selected and output.

6. The method of claim 5, wherein if there are more than one of the indexes belonging to the same group as the comparison index, a closest index to the input index is selected and output.

7. An apparatus for removing false contours in a PNM digital display device, which compares pixel data currently being processed in a current frame (hereinafter referred to as input data) with corresponding pixel data in a previous frame (hereinafter, referred to as comparison data), determines, based on a result of the comparison, whether or not false contours have occurred, and modulates and outputs the input data so that the false contours are removed, the apparatus comprising:
   a quantization and output data unit which compares the input data with the comparison data and calculates a plurality of possible output data in consideration of an index error between the input data and error-diffused input data so that the false contours are removed, the error-diffused input data being obtained by diffusing a quantization error that has occurred in pixels adjacent to the input data in the current frame;
   an error detection unit which detects an index error between the input data and the error-diffused input data; and
   a multiplexing unit which selects one from among the plurality of possible output data obtained by the quantization and output data unit in consideration of the index error detected by the error detection unit, and which send the selected output data to a display driving unit of said digital display device to display the input data without false contours.

8. The apparatus of claim 7 further comprising:
   a first error diffusion filtering unit which diffuses a quantization error that has occurred in pixels adjacent to the input data in a previous line of the current frame to the input data.

9. The apparatus of claim 8 further comprising:
   a second error diffusion filtering unit which diffuses a quantization error that has occurred in pixels adjacent to the input data in a current line of the current frame to a result of the error diffusion carried out by the first error diffusion filtering unit,
   wherein the error detection unit detects an index error between the input data and the error-diffused input data obtained by the first and second error diffusion filtering units.

10. A method of removing false contours in a pulse number modulation (PNM) digital display device, in which pixel data processed in a current frame (hereinafter, referred to as input data) is compared with corresponding pixel data in a previous frame (hereinafter, referred to as comparison data), wherein it is determined, based on a result of the comparison, whether or not false contours have occurred, and the input data is modulated and output so that the false contours are removed, the method comprising:
   a) diffusing a quantization error that has occurred in pixels adjacent to the input data in different scan lines of the current frame from a scan line that the input data belongs to;
   b) preparing a plurality of output data for compensating for possible false contours by comparing the input data with the comparison data;
   c) detecting a false contour error between the input data and error-diffused input data;
   d) selecting one from among the plurality of output data based on the detected false contour error; and
   e) sending the selected output data to a display driving unit of said digital display device to display the input data without false contours.

11. The method of claim 10, wherein the index error corresponds to a difference between an index of a subfield illumination pattern corresponding to the input data (hereinafter, referred to as an input index) and an index of a subfield illumination pattern corresponding to the comparison data (hereinafter, referred to as a comparison index).

12. The method of claim 10 further comprising:
e) diffusing a quantization error that has occurred in pixels adjacent to the input data in the same scan line of the current frame as the scan line that the input data belongs to, to a result of the error diffusion carried out in a), wherein in step c), a false contour error between the input data and the error-diffused input data obtained by carrying out a) and e).

* * * * *